US010875630B2

(12) United States Patent
McClements et al.

(10) Patent No.: US 10,875,630 B2
(45) Date of Patent: Dec. 29, 2020

(54) GUST LOADING MANAGEMENT

(71) Applicant: C SERIES AIRCRAFT LIMITED PARTNERSHIP, Mirabel (CA)

(72) Inventors: Arthur McClements, Kirkland (CA); Paul Kroese, Blainville (CA)

(73) Assignee: AIRBUS CANADA LIMITED PARTNERSHIP, Mirabel (CA)

( * ) Notice: Subject to any disclaimer, the term of this patent is extended or adjusted under 35 U.S.C. 154(b) by 186 days.

(21) Appl. No.: 16/311,832

(22) PCT Filed: Jun. 16, 2017

(86) PCT No.: PCT/IB2017/053603
§ 371 (c)(1),
(2) Date: Dec. 20, 2018

(87) PCT Pub. No.: WO2017/221123
PCT Pub. Date: Dec. 28, 2017

(65) Prior Publication Data
US 2019/0202544 A1 Jul. 4, 2019

Related U.S. Application Data

(60) Provisional application No. 62/352,850, filed on Jun. 21, 2016.

(51) Int. Cl.
*B64C 13/16* (2006.01)
*B64C 9/12* (2006.01)
*B64C 13/50* (2006.01)

(52) U.S. Cl.
CPC ............... *B64C 13/16* (2013.01); *B64C 9/12* (2013.01); *B64C 13/503* (2013.01)

(58) Field of Classification Search
CPC .......... B64C 13/16; B64C 13/503; B64C 9/12
See application file for complete search history.

(56) References Cited

U.S. PATENT DOCUMENTS

| 4,472,780 | A | * | 9/1984 | Chenoweth | .......... | G05D 1/0077 |
| | | | | | | 244/194 |
| 5,493,497 | A | * | 2/1996 | Buus | .................... | G05D 1/0077 |
| | | | | | | 701/4 |
| 9,446,837 | B2 | * | 9/2016 | Wildschek | ............ | B64C 13/16 |
| 2009/0292405 | A1 | | 11/2009 | Najmabadi et al. | | |
| 2015/0028162 | A1 | * | 1/2015 | Wildschek | ............... | G05D 1/00 |
| | | | | | | 244/76 C |

FOREIGN PATENT DOCUMENTS

| CA | 2510115 | 12/2005 |
| EP | 2551737 | 1/2013 |
| EP | 2930102 | 10/2015 |
| WO | 2015088967 | 6/2015 |

OTHER PUBLICATIONS

International Search Report and Written Opinion dated Sep. 28, 2017 in connection with PCT application No. PCT/IB2017/053603.

* cited by examiner

*Primary Examiner* — Michael J Zanelli
(74) *Attorney, Agent, or Firm* — Norton Rose Fulbright Canada LLP

(57) ABSTRACT

The present disclosure provides methods and system for managing gust loading in an aircraft. A deflection angle of one or more spoilers of the aircraft is monitored. When the spoiler deflection angle is above a first threshold value, one or more aileron control signals are sent to the ailerons. The aileron control signals cause the ailerons to deflect based on the spoiler deflection angle.

26 Claims, 8 Drawing Sheets

GUST LOADING MANAGEMENT

CROSS-REFERENCE TO RELATED APPLICATIONS

The present application claims the benefit of U.S. Provisional Patent Application No. 62/352,850 filed on Jun. 21, 2016, the contents of which are hereby incorporated by reference.

TECHNICAL FIELD

The present disclosure relates generally to fly-by-wire aircraft, and more specifically to gust loading management in fly-by-wire aircraft.

BACKGROUND OF THE ART

While traditional aircraft were largely mechanical systems, many modern aircraft have adopted so-called "fly-by-wire" technology. Put briefly, traditional aircraft use mechanical linkages to translate an operator command, such as a pedal being pressed or a flight stick being tilted, to cause flight control surfaces to move, for example an aileron being raised or lowered. In contrast, fly-by-wire aircraft convert operator commands into electrical signals, whether analog or digital. A fly-by-wire controller processes the received operator commands to generate control signals which are then sent to flight control surfaces. The flight control surfaces then modify their behavior based on the received signals.

In aircraft aerodynamics, wing loading is a term used to describe the amount of weight per unit area loaded on an aircraft wing. Basic wing loading is based on the weight of an aircraft and the size of its wings, but in flight, the amount of lift generated by the aircraft (based on the speed of the aircraft) and various environmental factors can affect wing loading. One particular environmental factor is gust loading, caused by gusts of wind which push upwards on undersides of the wings. Gust loading can cause unwanted movement in the aircraft, as well as cause the wings of the aircraft to bend or twist. While gust loading can be alleviated by providing larger or stiffer wings, these solutions increase the overall fly weight of the aircraft, which in turn reduce fuel efficiency and range of the aircraft.

As such, there is a need for techniques for managing gust loading which do not rely on larger or stiffer wings.

SUMMARY

The present disclosure provides methods and system for managing gust loading in an aircraft. A deflection angle of one or more spoilers of the aircraft is monitored. When the spoiler deflection angle is above a first threshold value, one or more aileron control signals are sent to the ailerons. The aileron control signals cause the ailerons to deflect based on the spoiler deflection angle.

In accordance with a broad aspect, there is provided a method for managing gust loading in an aircraft, comprising monitoring a spoiler deflection angle of at least one spoiler of the aircraft; and when the spoiler deflection angle is above a first threshold, sending at least one aileron control signal for causing at least one aileron to deflect based on the spoiler deflection angle.

In some embodiments, when the spoiler deflection angle is above a first threshold and below a second threshold greater than the first threshold, the at least one aileron control signal comprises a first aileron control signal for causing the at least one aileron to deflect according to an interpolated trajectory.

In some embodiments, when the spoiler deflection angle is above the second threshold, the at least one aileron control signal comprises a second aileron control signal for causing the at least one aileron to deflect upwards to a predetermined angle.

In some embodiments, when the spoiler deflection angle is below the first threshold, the at least one aileron control signal comprises at least one third aileron control signal for allowing the at least one aileron a substantially complete range of motion.

In some embodiments, monitoring the spoiler deflection angle of at least one spoiler of the aircraft comprises continuously monitoring the spoiler deflection angle.

In some embodiments, the interpolated trajectory is a linearly-interpolated trajectory based on an aileron deflection angle of the aileron at the first threshold and a predetermined angle.

In some embodiments, the at least one second aileron control signal is sent to the at least one aileron when the spoiler deflection angle is above the second threshold and below a third threshold greater than the second threshold.

In some embodiments, the at east one aileron control signal differs based on a direction of deployment of the spoiler.

In some embodiments, the aileron control signal causes the at least one aileron to deflect along one of two portions of hysteresis trajectory based on the direction of deployment of the spoiler.

In some embodiments, the aileron control signal causes the at least one aileron to deflect along a trajectory based on a rate of change of the spoiler deflection angle.

In some embodiments, monitoring the spoiler deflection angle comprises receiving a command and extracting the spoiler deflection angle therefrom.

In some embodiments, sending the at least one aileron control signal comprises sending a respective aileron control signal to a plurality of portions of at least one split aileron; and causing the at least one aileron to deflect based on the spoiler deflection angle comprises causing each portion of the at least one split aileron to deflect based on the spoiler deflection angle.

In some embodiments, the plurality of portions of the at least one split aileron comprises at least a first group of portions and a second group of portions; and causing each portion of the at least one split aileron to deflect based on the spoiler deflection angle comprises causing the first group of portions to deflect by a first aileron deflection angle; and causing the second group of portions to deflect by a second aileron deflection angle.

According to another broad aspect, there is provided a system for managing gust loading in an aircraft, the system comprising a processing unit; and a non-transitory memory communicatively coupled to the processing unit and comprising computer-readable program instructions. The computer-readable program instructions are executable by the processing unit for monitoring a spoiler deflection angle of at least one spoiler of the aircraft; and when the spoiler deflection angle is above a first threshold, sending at least one aileron control signal for causing at least one aileron to deflect based on the spoiler deflection angle.

In some embodiments, when the spoiler deflection angle is above a first threshold and below a second threshold greater than the first threshold, the at least one aileron control signal comprises a first aileron control signal for causing the at least one aileron to deflect according to an interpolated trajectory.

In some embodiments, wherein, when the spoiler deflection angle is above the second threshold, the at least one aileron control signal comprises a second aileron control signal for causing the at least one aileron to deflect upwards to a predetermined angle.

In some embodiments, when the spoiler deflection angle is below the first threshold, the at least one aileron control signal comprises at least one third aileron control signal for allowing the at least one aileron a substantially complete range of motion.

In some embodiments, monitoring the spoiler deflection angle of at least one spoiler of the aircraft comprises continuously monitoring the spoiler deflection angle.

In some embodiments, the interpolated trajectory is a linearly-interpolated trajectory based on an aileron deflection angle of the aileron at the first threshold and a predetermined angle.

In some embodiments, the at least one second aileron control signal is sent to the at least one aileron when the spoiler deflection angle is above the second threshold and below a third threshold greater than the second threshold.

In some embodiments, the at least one aileron control signal differs based on a direction of deployment of the spoiler.

In some embodiments, the aileron control signal causes the at least one aileron to deflect along one of two portions of hysteresis trajectory based on the direction of deployment of the spoiler.

In some embodiments, the aileron control signal causes the at least one aileron to deflect along a trajectory based on a rate of change of the spoiler deflection angle.

In some embodiments, monitoring the spoiler deflection angle comprises receiving a command and extracting the spoiler deflection angle therefrom.

In some embodiments, sending the at least one aileron control signal comprises sending a respective aileron control signal to a plurality of portions of at least one split aileron; and causing the at least one aileron to deflect based on the spoiler deflection angle comprises causing each portion of the at least one split aileron to deflect based on the spoiler deflection angle.

In some embodiments, the plurality of portions of the at least one split aileron comprises at least a first group of portions and a second group of portions; and causing each portion of the at least one split aileron to deflect based on the spoiler deflection angle comprises causing the first group of portions to deflect by a first aileron deflection angle; and causing the second group of portions to deflect by a second aileron deflection angle.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

A control technique is applied for operating ailerons of an aircraft with flexible wings in order to alleviate gust loading. An aircraft with wings has a plurality of flight control components thereon, including one or more spoilers and one or more ailerons. In order to manage gust loading for the aircraft, a deflection angle for the spoilers is monitored. When the spoiler deflection angle(s) are above a first threshold, one or more aileron control signals are sent to the ailerons to cause the ailerons to deflect based on the spoiler deflection angle(s).

Figure 1:
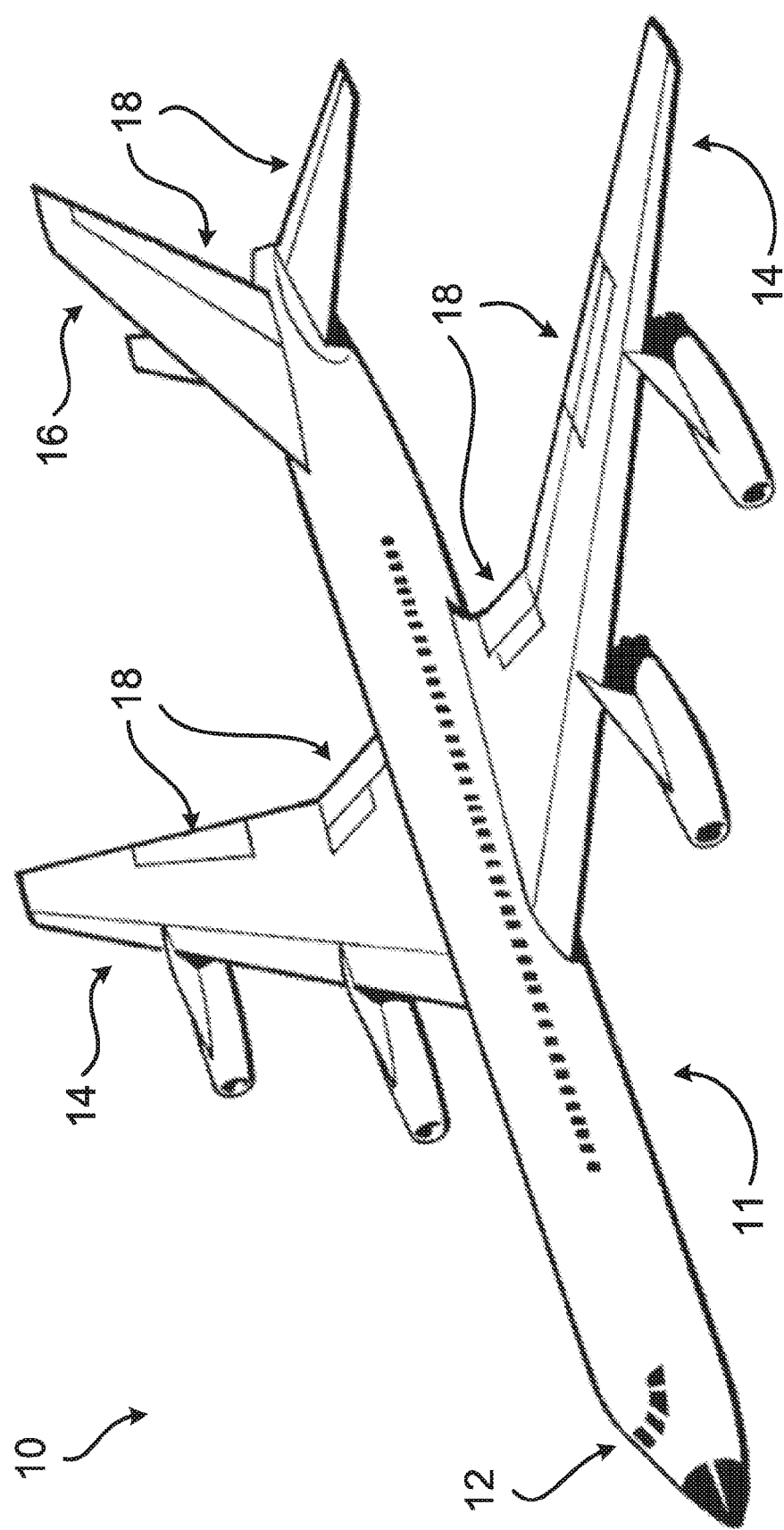
FIG. 1 is a diagram of an example aircraft.

With reference to FIG. 1, a typical modern aircraft 10, having a fuselage 11, a pair of wings 14, and a tail 16, is equipped with a cockpit 12 and one or more flight control surfaces 18. The aircraft 10 can be any type of aircraft, including propeller planes, jet planes, turbofan planes, turbo-propeller planes, turboshaft planes, gliders, and the like. The cockpit 12 may be positioned at any suitable location on the aircraft 10, for example at a front portion of the fuselage 11. The cockpit 12 is configured for accommodating one or more pilots who control the operation of the aircraft 10 by way of one or more operator controls (not illustrated). The operator controls may include any suitable number of pedals, yokes, steering wheels, centre sticks, flight sticks, levers, knobs, switches, and the like.

The flight control surfaces 18 can be positioned at any suitable location on the aircraft 10, and may include any suitable number of ailerons, airbrakes, elevators, flaps, flaperons, rudders, spoilers, spoilerons, stabilators, trim tabs, and the like. In one particular embodiment of the aircraft 10, each wing 14 is equipped with at least one aileron, and the tail 16 has at least one rudder and at least one elevator. The aircraft 10 can also be equipped with any number of additional suitable flight control surfaces 18.

Figure 2:
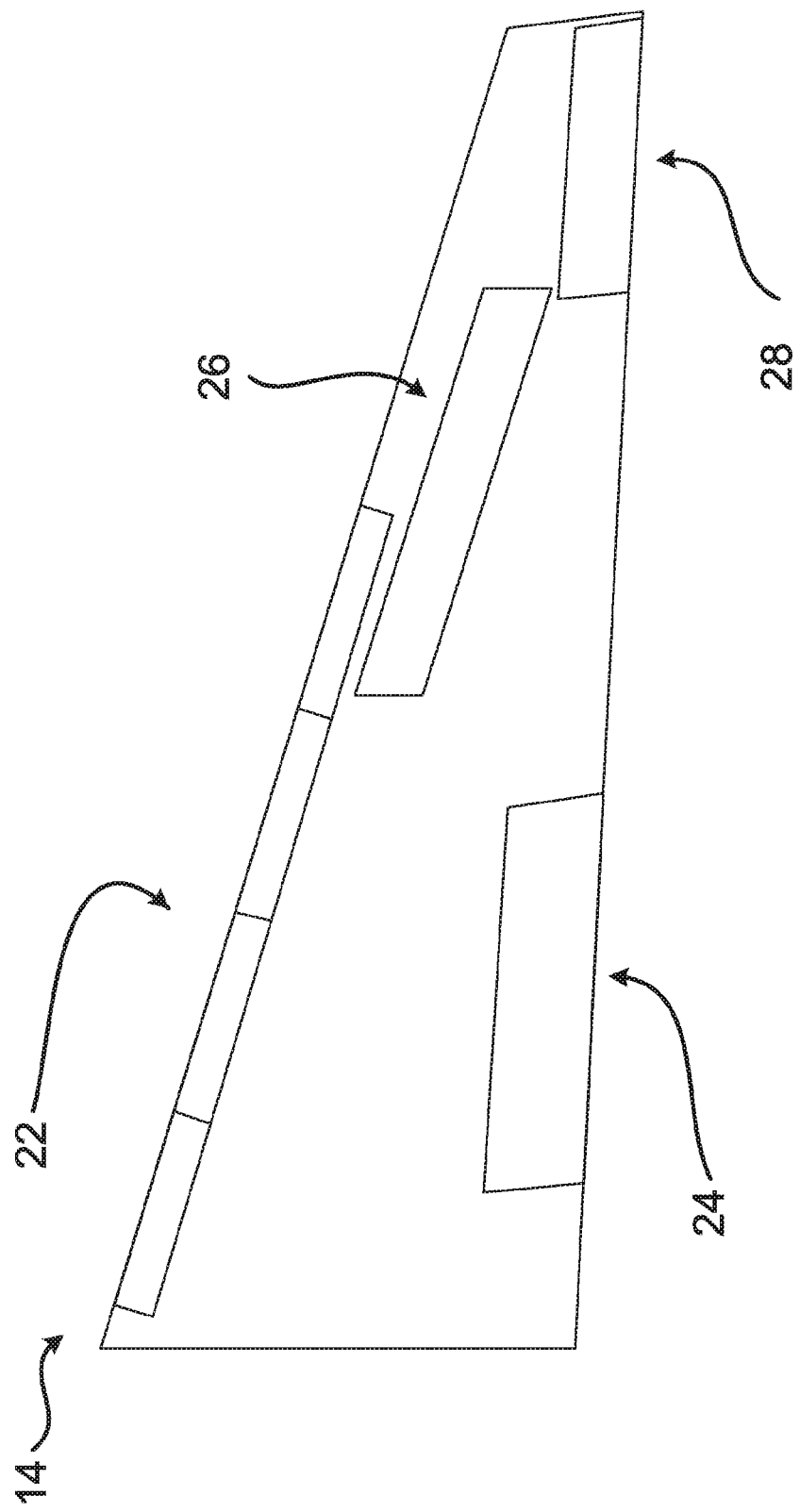
FIG. 2 is a diagram of an example wing of the aircraft of FIG. 1.

With reference to FIG. 2, in some embodiments the wing 14 is configured with a plurality of flight control surfaces 18. For example, the wing 14 is a flexible wing, and has a one or more slats 22, a flap 24, a spoiler 26, and an aileron 28. In some embodiments, the spoiler 26 is a multi-function spoiler. In some embodiments, the aileron 28 is a wholly-formed aileron. In some other embodiments, the aileron 28 is a split aileron, which is composed of a plurality of portions which may vary in shape and size. The split aileron portions may be rectangular, trapezoidal, square, parallelogram-like, or may take on any other suitable shape. In some embodiments, the portions of the split aileron are all of the same shape and/or size, and in other embodiments the portions are of different shapes and/or sizes. In some embodiments, the portions of the split aileron are adjacent, and in other embodiments one or more wing structures (not illustrated) of the wing 14 is disposed between the portions of the split aileron. The split aileron may be split into two, three, four, or five portions, or may be split into any other suitable number of portions.

Figure 3:
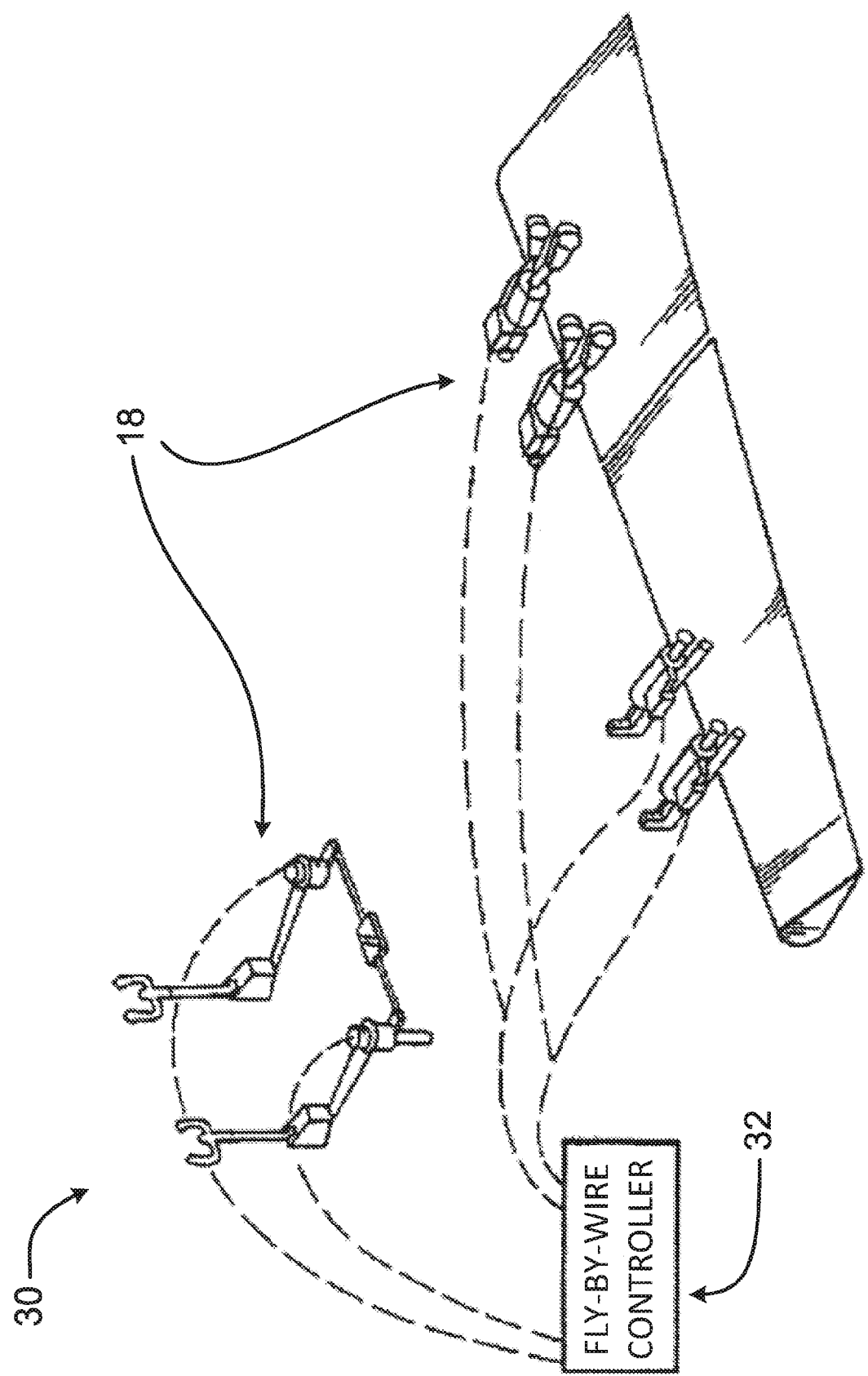
FIG. 3 is a block diagram of an example fly-by-wire implementation, according to an embodiment.

With reference to FIG. 3, the aircraft 10 may use a fly-by-wire (FBW) control system 30 which has a FBW controller 32 which controls the operation of the flight control surfaces 18, including the spoiler 26 and the aileron 28. In the FBW control system 30, there is no direct mechanical coupling between the operator controls and the flight control surfaces 18. The FBW control system 30 may include the operator controls which provide operator commands, in the form of electrical signals, to the FBW controller 32. The FBW controller 32 may combine the operator commands with other aircraft data to produce flight control signals. Instead of mechanical linkages and their attendant displacement/translation, the commands are transmitted across wires to electrically control the movement of actuator/motors that move the flight control surfaces 18. For purposes of safety, the FBW control system 30 includes redundant components (not illustrated) so that if one component of the FBW control system 30 fails, the aircraft 10 can still be safely controlled. In some embodiments, redundancy is provided on an axis-by-axis basis. For example, the FBW control system 30 has separate systems that control the movement of the aircraft 10 in each of the roll, pitch and yaw axes.

In some embodiments where the aileron 28 is a split aileron, the split aileron is controlled by a single actuator/motor which moves each of the portions of the split aileron in accordance with aileron control signals sent by the FBW controller 32. In other embodiments, each of the portions of the split aileron is provided with a separate actuator/motor. In still further embodiments, one or more portions of the split aileron share an actuator/motor, and one or more other portions of the split aileron are provided with separate actuators/motors, as appropriate. The FBW controller 32 is configured for providing aileron control signals to the actuators/motors which move each of the portions of the split aileron.

Figure 4:
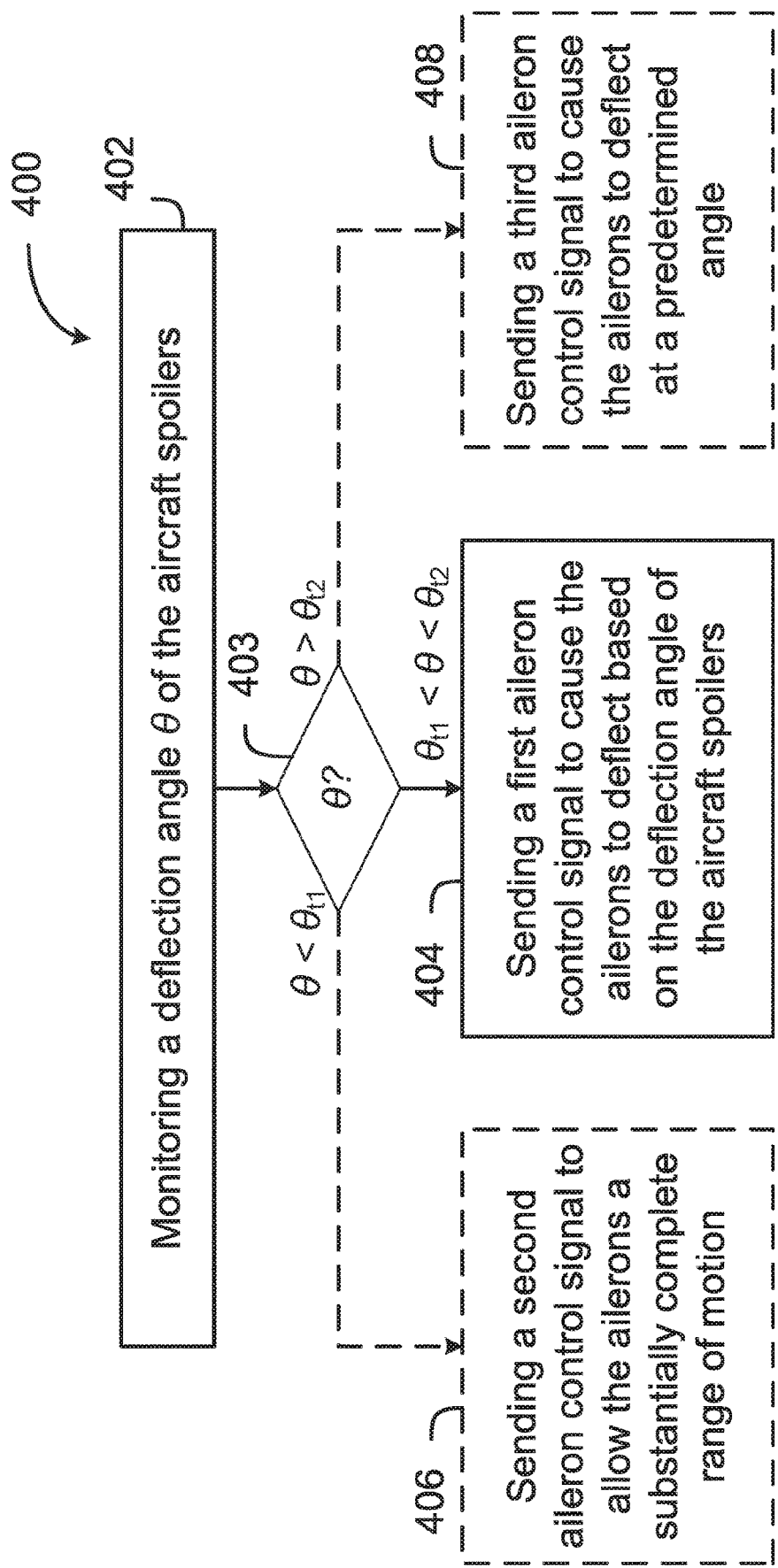
FIG. 4 is flowchart of a method for alleviating gust loading in accordance with an embodiment.

With reference to FIG. 4, the FBW control system 30 is configured for implementing a method 400 for managing gust loading in an aircraft, such as the aircraft 10. While the following paragraphs discuss the various flight control surfaces 18 in the singular, it should be noted that in certain embodiments the steps described herein apply to a plurality of flight control surfaces 18 present on both wings 14.

At step 402, a deflection angle $\theta$ of the spoiler 26 is monitored. The spoiler deflection angle $\theta$ may be monitored by any suitable means, for example by way of a sensor. In some embodiments, the spoiler deflection angle $\theta$ is continuously monitored, for example by the FBW controller 32, or by other suitable components of the FBW system 30, and may be logged in a memory or other data storage device. In some other embodiments, the spoiler deflection angle $\theta$ can be extracted from an operator command received from the operator controls, for example an operator command for causing a deflection of the spoiler 26.

The spoiler deflection angle $\theta$ may be represented within the FBW control system 30 via any suitable means and using any suitable units. For example, the spoiler deflection angle $\theta$ is stored as a floating point variable indicative of a number of radians of deflection from an origin point. In another example, the spoiler deflection angle $\theta$ is stored as a floating point variable indicative of a number of degrees of deflection relative to a "neutral" reference point, such as a horizontal ground or sea level. Other methods of representing and/or storing the spoiler deflection angle $\theta$ are also considered.

The spoiler deflection angle $\theta$ is compared against a pair of threshold angles, as illustrated by decision box 403. If the spoiler deflection angle $\theta$ is greater than the first threshold angle $\theta_{t1}$ but less than the second threshold angle $\theta_{t2}$ (with $\theta_{t2}$ being greater than $\theta_{t1}$), the method 400 moves to step 404. Optionally, decision box 403 can lead to two other steps. If the spoiler deflection angle $\theta$ is less than a first threshold angle $\theta_{t1}$, the method 400 moves to step 406. If the spoiler deflection angle $\theta$ is greater than the second threshold angle $\theta_{t2}$, the method 400 moves to step 408. In some embodiments; the method 400 only moves to step 408 if the spoiler deflection angle $\theta$ is greater than the second threshold angle $\theta_{t2}$ but less than a third threshold angle $\theta_{t3}$ (with $\theta_{t3}$ being greater than $\theta_{t2}$). In these embodiments, decision box 403 leads to fourth option (not illustrated) if the spoiler deflection angle $\theta$ is above the third threshold angle $\theta_{t3}$.

The first; second, and optionally third threshold angles $\theta_{t1}$, $\theta_{t2}$, $\theta_{t3}$ (collectively the "threshold angles") may be defined as based on any suitable characteristic of the aircraft 10. In some embodiments, the threshold angles vary with the flexibility of the wings 14; the length and/or shape of the wings 14, the location of the wings 14 on the fuselage 11, and the like. The threshold angles may also vary with the size, shape, and location of the spoilers 26 and the ailerons 28. In some embodiments, the range of motion, i.e., the total range of deflection angles, afforded to the spoilers 26 and/or the ailerons 28 may determine at least in part the value of the threshold angles. Still other factors may affect the threshold angles, such as known sensor tolerances and hedging to counter possible failures of the flight control surfaces 18. In some embodiments, the threshold angles may vary dynamically, for example based on ambient temperature or other environmental factors, on an age or wear level of the aircraft 10 and/or the wing 14, on an operational status of the aircraft 10 and/or of the FBW system 30, and the like. In accordance with a non-limiting example, the first threshold angle $\theta_{t1}$ is set at 5° and the second threshold angle $\theta_{t2}$ is set at 15°. These values are examples, and other values may also apply.

When the spoiler deflection angle $\theta$ of the spoiler 26 is between the first threshold angle $\theta_{t1}$ and the second threshold angle $\theta_{t2}$ the method 400 moves to step 404, and a first aileron control signal is sent. The first aileron control signal may be sent to the aileron 28, or to a controller thereof (not illustrated). The first aileron control signal causes the aileron 28 to deflect based on the spoiler deflection angle $\theta$. Thus, the amount by which the aileron 28 is deflected will vary depending on the value of the spoiler deflection angle $\theta$.

For example, the FBW controller 32 receives a command to deploy the spoiler 26 to a certain angle. The command may be for causing the spoiler 26 to be deployed to a predetermined angle, to a position relative to the total possible deployment (e.g. 50% deployed), or to be fully deployed. Once the spoiler deflection angle $\theta$, which is being monitored, is found to exceed the first threshold angle $\theta_{t1}$, the first aileron control signal is sent. The first aileron control signal instructs the aileron 28 and/or a controller thereof to cause the aileron 28 to deflect. If the monitored spoiler deflection angle $\theta$ continues to vary, further first aileron control signals may be sent to the aileron 28 or the controller thereof to cause the aileron 28 to deflect based on the spoiler deflection angle $\theta$.

In cases where the spoiler deflection angle $\theta$ is found to be continuously varying, the first aileron control signal may also cause the aileron 28 to vary an angle of deflection of the aileron 28 in a fashion commensurate with the variation of the spoiler deflection angle θ. Thus, the aileron deflection angle may follow a trajectory based on the variation of the spoiler deflection angle θ. In some embodiments, the aileron deflection angle follows a trajectory based on an interpolation between two points, for example the aileron deflection angle when the spoiler deflection angle θ is equal to the first threshold angle $θ_{t1}$ and a predetermined aileron deflection angle, which may be a maximal deflection angle used for managing gust loading. The interpolation may be a linear interpolation, or may follow some non-linear function or equation.

In some embodiments, depending on the direction of deployment of the spoiler 26, the first aileron control signal may vary. Put differently, the first aileron control signal sent to the aileron 28 and/or the aileron controller when the spoiler 26 is deployed to extend away from the wing 14 may be different from the first aileron control signal sent to the aileron 28 and/or the aileron controller when the spoiler 26 is deployed to retract toward the wing 14. In some such embodiments, the aileron deflection angle follows a hysteresis curve based on the spoiler deflection angle θ. For example, a first portion of the hysteresis curve is followed when the spoiler 26 is extending away from the wing 14, and a second portion of the hysteresis curve is followed when the spoiler 26 is retracting toward the wing 14.

In still further embodiments, the first aileron control signal causes the aileron 28 to deflect along a trajectory based on the rate of change of the spoiler deflection angle θ. For example, when the spoiler deflection angle θ varies slowly, the trajectory along which the aileron 28 is deflected approaches the aforementioned predetermined aileron deflection angle less quickly than when the spoiler deflection angle θ varies quickly. The first aileron control signal, and the trajectory along which the aileron 28 is deflected, may still vary in other ways. The aileron 28 may deflect toward the predetermined aileron deflection angle, or to some other value, until the spoiler deflection angle θ reaches the second threshold angle $θ_{t2}$.

When the spoiler deflection angle S of the spoiler 26 is less than the first threshold angle $θ_{t1}$, the method 400 moves to step 406, and a second aileron control signal is sent. The second aileron control signal may be sent to the aileron 28, or to the aileron controller. The second aileron control signal allows the aileron 28 a substantially complete range of motion: no deflection is forced upon the aileron 28, and other aileron control signals beyond the first, second, and third aileron control signals discussed herein may cause the aileron 28 to deflect or downward as per one or more commands. Thus, the second aileron control signal may remove any restrictions which had previously been placed on the deflection of the aileron 28, for example because the spoiler deflection angle had previously been above the first threshold angle $θ_{t1}$.

When the spoiler deflection angle θ is above the second angle threshold $θ_{t2}$ (and optionally, below the third angle threshold $θ_{t3}$) the method moves to step 408 and a third aileron control signal is sent. The third aileron control may be sent in similar fashion to the first and second aileron control signals. The third aileron control signal causes the aileron 28 to deflect to the aforementioned predetermined aileron deflection angle. The predetermined aileron deflection angle may be any suitable angle, for example 1°, 2°, 2.5° C., 3°, or any other suitable value. The aileron 28 may be maintained at the predetermined aileron deflection angle as long as the spoiler deflection angle is greater than the second angle threshold $θ_{t2}$ (and optionally, below the third angle threshold $θ_{t3}$).

In some embodiments, the first, second, and third aileron control signals are generated by the FBW controller 32. The aileron control signals may be generated in any suitable way, and may be in any suitable format. In some embodiments, the aileron control signals are digital, and in other embodiments, the aileron control signals are analog. If the spoiler deflection angle θ is determined to be exactly at one of the threshold angles $θ_{t1}$, $θ_{t2}$, and optionally $θ_{t3}$, the decision box 403 may proceed with the lower option or with the higher option. Alternatively, the decision box 403 may rely on other factors to choose which of steps 404, 406, 408 to implement if the spoiler deflection angle θ is determined to be exactly at one of the threshold angles.

In embodiments where the aileron 28 is a split aileron having a plurality of portions, the portions may be divided into groups, and different aileron control signals may be sent to the different groups. For example, when the spoiler deflection angle θ is between the first threshold angle $θ_{t1}$ and the second threshold angle $θ_{t2}$, the first aileron control signals can cause a first group of portions to be deflected upward at a first aileron deflection angle, and to follow a first deflection trajectory, and can cause a second group of portions to be deflected upward at a second aileron deflection angle, and to follow a second deflection trajectory. Similarly, for example, when the spoiler deflection angle θ is above the second threshold angle $θ_{t2}$, the third aileron control signals can cause the first group of portions to be deflected at a first predetermined aileron deflection angle, and can cause the second group of portions to be deflected at a second predetermined aileron deflection angle. In some further embodiments, the portions may be divided into three or more groups and similar deflection patterns may apply.

Figure 5:
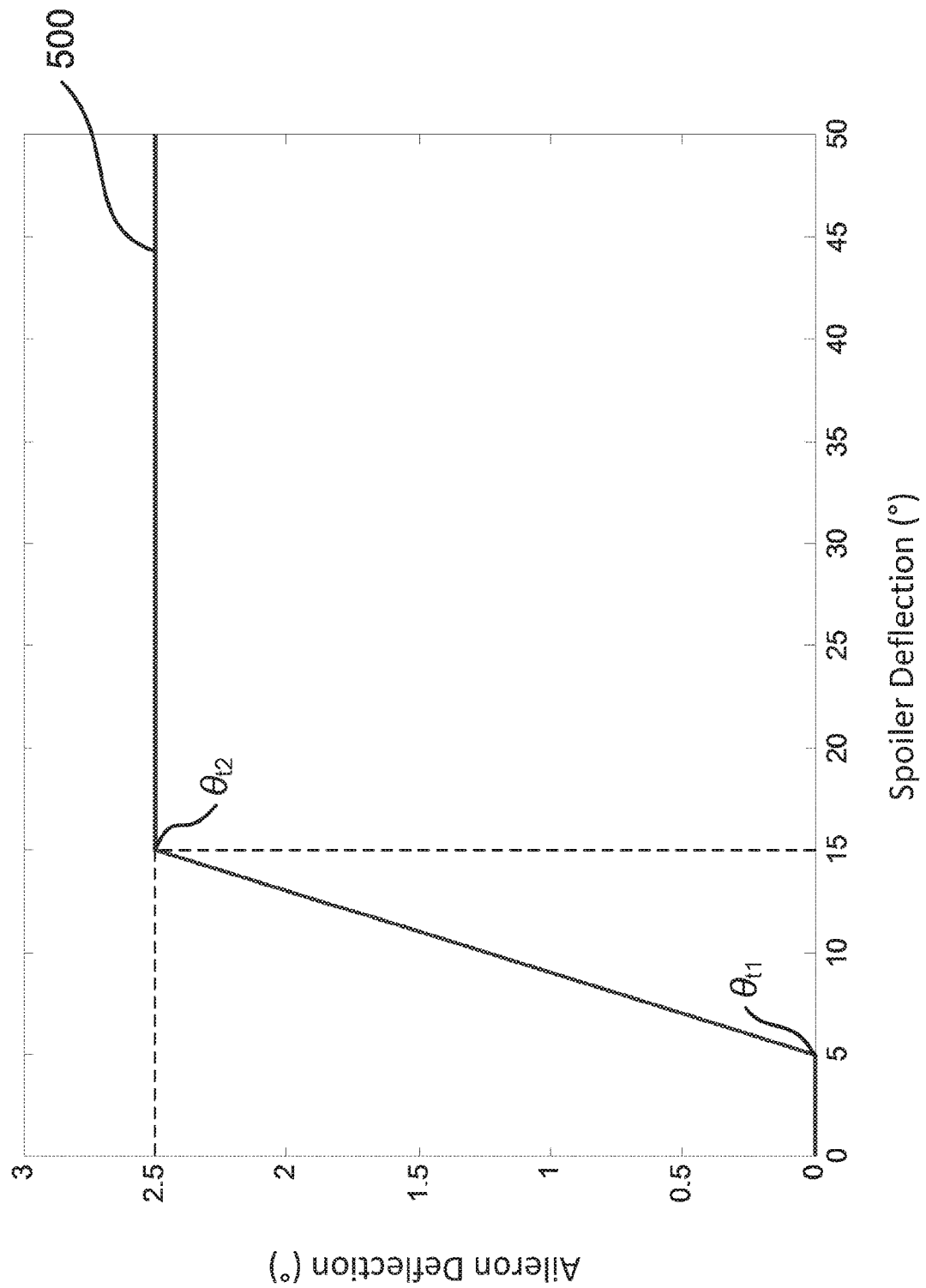
FIG. 5 is a graphical representation of an example aileron response to a spoiler deflection.

By changing the deflection angle of the aileron 28 as a function of the spoiler deflection angle θ, the effective surface area of the wing 14 can be varied to passively manage gust loading and to adjust level flight load distribution. More specifically, many jurisdictions have regulations which require that gust loading be computed for both deployed and retracted spoilers 26. When the spoilers 26 deploy, the amount of lift in the area of the wing 14 where the aileron 28 is located is increased to recover level flight. This is because the spoilers 26 cause lift loss, and by adjusting the ailerons 28 the aircraft 10 can recover the lift. The outer wing lift is then reduced again by gust loading alleviation by putting the ailerons up such that the total load remains within the given structural strength. With reference to FIG. 5, the aileron deflection angle as a function of the spoiler deflection angle θ can be represented in graphical form by line 500. Before the first threshold angle $θ_{t1}$, which is set at 5°, no aileron deflection is forced upon the aileron 28. Between the first threshold angle $θ_{t1}$ and the second threshold angle $θ_{t2}$, which is set at 15°, the aileron deflection can follow a linear path. Above the second threshold angle $θ_{t2}$, the aileron deflection can be set at the predetermined aileron deflection angle, which is set at 2.5°. These values are examples, and other values may also apply. In some embodiments, the ailerons 28 of the wings 14 of the aircraft 10 are provided with different aileron control signals depending on the wing 14 on which they are located.

Figure 6A:
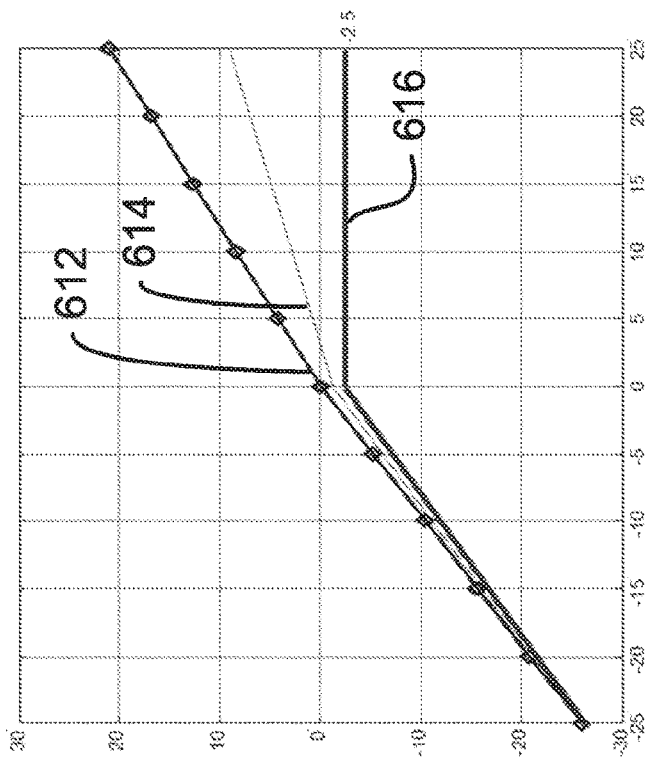
FIGS. 6A-B are graphical representations of example aileron responses to different input commands based on spoiler deflection.
Figure 6B:
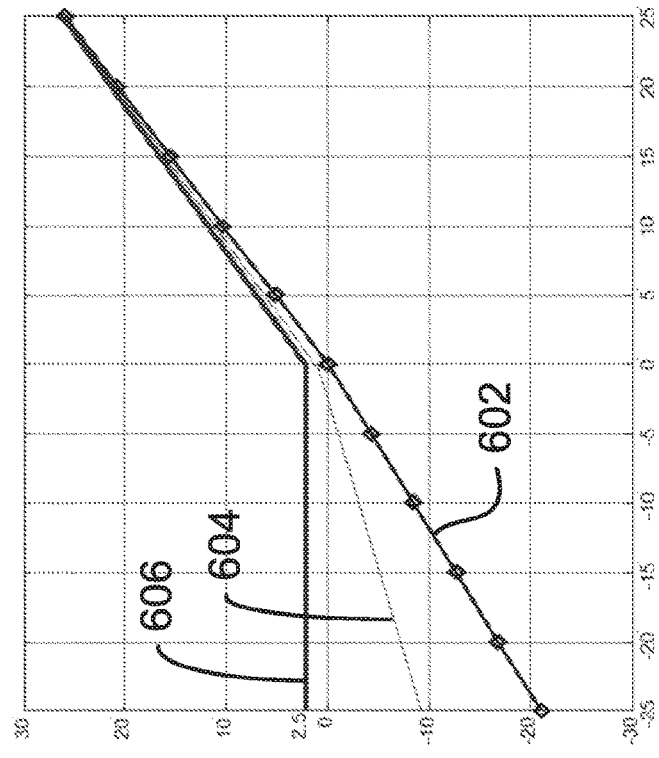

With reference to FIGS. 6A-B, an example control scheme for aileron deflection are illustrated, showing the aileron deflection angle caused by a given aileron deflection command. In this example, respective aileron control signals are sent to the ailerons 28 located on the wings 14, such that a port-side wing 14 is provided the control scheme of FIG. 6A, and a starboard-side wing 14 is provided the control scheme of FIG. 6B. Lines 602 and 612 represent the aileron deflection angle when the spoiler 26 is deflected at an angle equal or below the first threshold angle $\theta_{t1}$, illustrating the full range of motion of the aileron 28. Lines 604 and 614 represent the aileron deflection angle when the spoiler 26 is deflected at an angle between the first threshold angle $\theta_{t1}$ and the second threshold angle $\theta_{t2}$, illustrating the linear interpolation of the aileron deflection angle. Lines 606 and 616 represent the aileron deflection angle when the spoiler 26 is deflected at an angle beyond the second threshold angle $\theta_{t2}$, illustrating the aileron 28 being deflected at the predetermined aileron deflection angle, in this case 2.5°.

Figure 7:
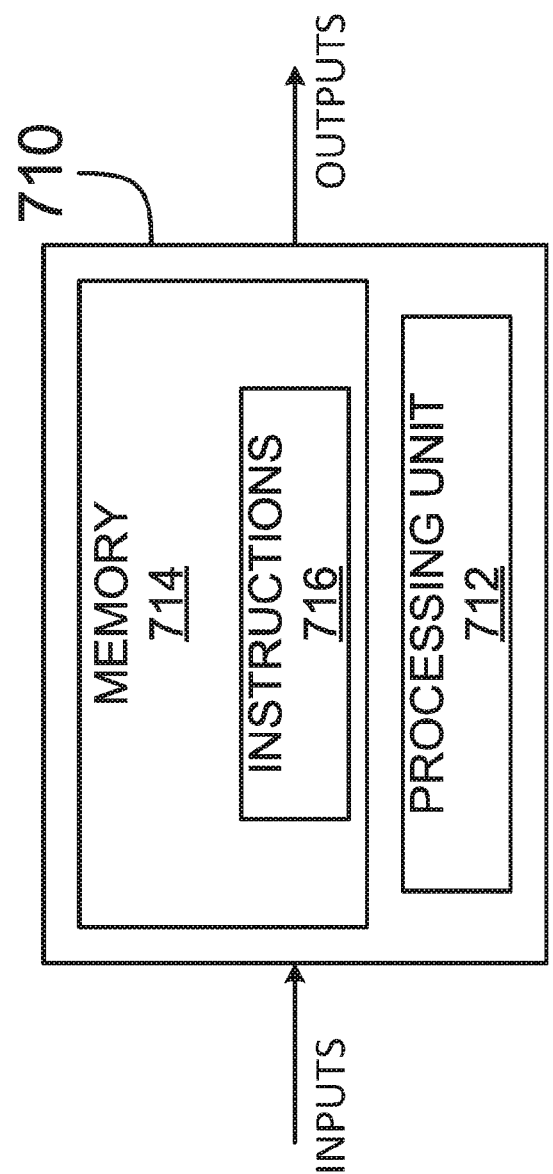
FIG. 7 is a schematic diagram of an example computing system for implementing the method of FIG. 4 in accordance with an embodiment.

With reference to FIG. 7, the method 400 may be implemented by a computing device 710, comprising a processing unit 712 and a memory 714 which has stored therein computer-executable instructions 716. The processing unit 712 may comprise any suitable devices configured to cause a series of steps to be performed so as to implement the method 400 such that instructions 716, when executed by the computing device 710 or other programmable apparatus, may cause the functions/acts/steps specified in the methods described herein to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium such as, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory may comprise any storage means (e.g., devices) suitable for retrievably storing machine-readable instructions executable by processing unit.

Figure 8:
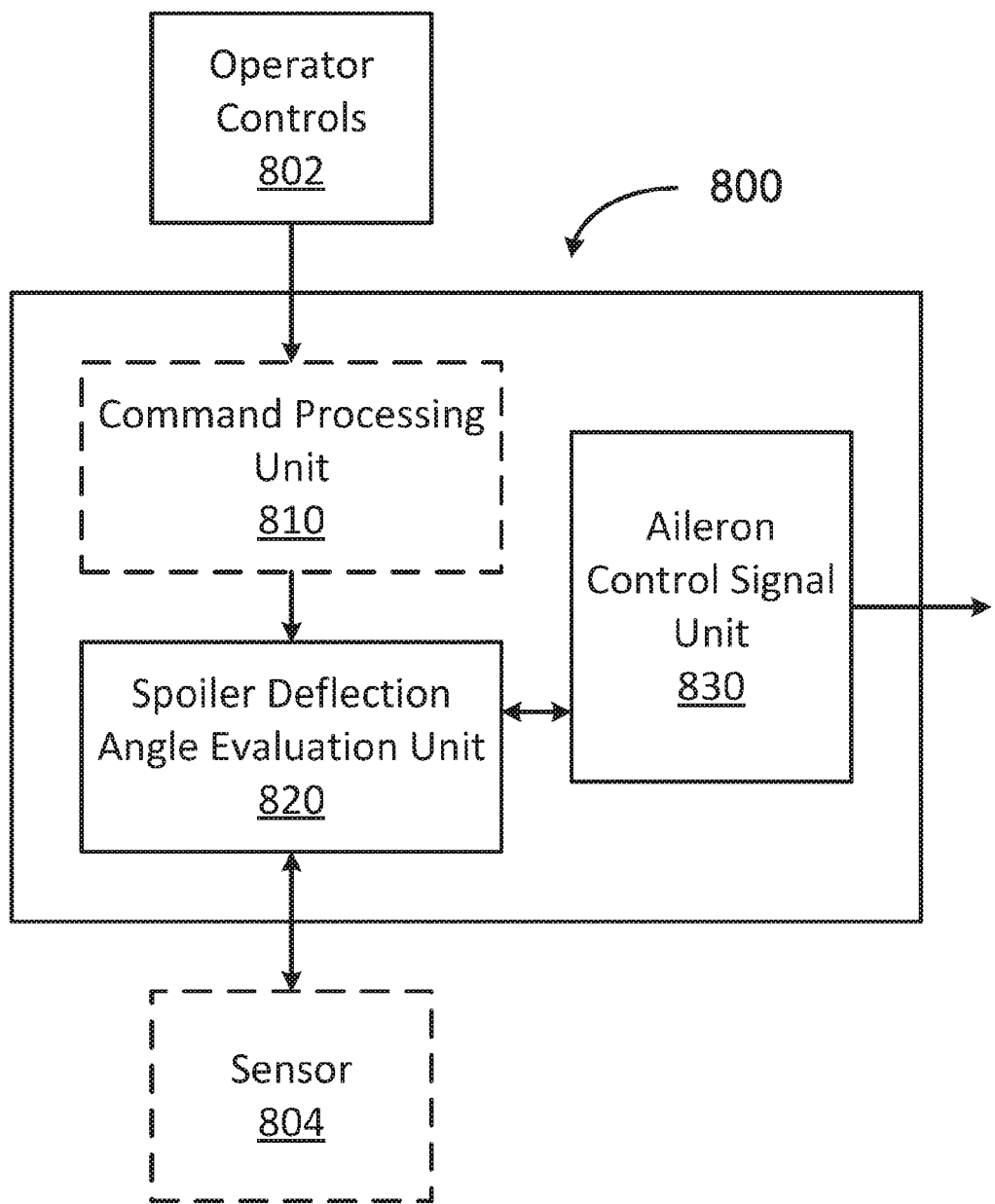
FIG. 8 is a block diagram of an example implementation of a gust loading alleviation system.

With reference to FIG. 8, an example computer-based implementation of the method 400 is illustrated as aileron control system 800. The aileron control system 800 may be included in the FBW controller 32, and includes a spoiler deflection angle evaluation unit 820, an aileron control signal unit 830, and optionally a command processing unit 810. The spoiler deflection angle evaluation unit 820 is configured for monitoring the spoiler deflection angle $\theta$ of the spoiler 26, in accordance with step 402. The spoiler deflection angle evaluation unit 820 may monitor the spoiler deflection angle 9 by way of an optional sensor 804, or may extract the spoiler deflection angle $\theta$ from a command. The command may be received from the operator controls 802 by the command processing unit 810, which may determine whether the command is for causing a change in the spoiler deflection angle $\theta$. If the command is for causing a change in the spoiler deflection angle $\theta$, the command processing unit 10 may pass on the command to the spoiler deflection angle evaluation unit 820, which may the extract the spoiler deflection angle $\theta$ from the command.

The spoiler deflection angle evaluation unit 820 is configured for providing the spoiler deflection angle $\theta$ to the aileron control signal unit 830, which then implements the decision box 403, and proceeds to perform step 404 when the spoiler deflection angle $\theta$ is between the first threshold angle $\theta_{t1}$ and the second threshold angle $\theta_{t2}$, to perform step 406 when the spoiler deflection angle $\theta$ is below the first threshold angle $\theta_{t1}$, to perform step 408 when the spoiler deflection angle $\theta$ is above the second threshold angle $\theta_{t2}$. Specifically, the aileron control signal unit 830 is configured to send aileron control signals to the aileron 28 to cause the aileron 28 to behave in one or more of the ways described hereinabove.

In some embodiments, the aileron control signal unit 830 sends the aileron control signals directly to motors/actuators (not illustrated) of the aileron 28. In other embodiments, the aileron control signals are sent to an intermediary unit (not pictured), which translates the aileron control signals sent by the aileron control signal unit 830 into signals to be sent to the aileron 28.

The methods and systems for managing gust loading in an aircraft, for example by controlling the deflection of the aileron 28 of the aircraft 10, described herein may be implemented in a high level procedural or object oriented programming or scripting language, or a combination thereof, to communicate with or assist in the operation of a computer system, for example the computing device 710. Alternatively, the methods and systems for managing gust loading in an aircraft described herein may be implemented in assembly or machine language. The language may be a compiled or interpreted language. Program code for implementing the methods and systems for managing gust loading in an aircraft described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for managing gust loading in an aircraft described herein may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the methods and systems for managing gust loading in an aircraft disclosed herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

The invention claimed is:

1. A method for managing gust loading in an aircraft, comprising:
   monitoring a spoiler deflection angle of at least one spoiler of the aircraft; and
   when the spoiler deflection angle is above a first threshold, sending at least one aileron control signal for causing at least one aileron to deflect based on the spoiler deflection angle.

2. The method of claim 1, wherein when the spoiler deflection angle is above a first threshold and below a second threshold greater than the first threshold, the at least one aileron control signal comprises a first aileron control signal for causing the at least one aileron to deflect according to an interpolated trajectory.

3. The method of claim 2, wherein the interpolated trajectory is a linearly-interpolated trajectory based on an aileron deflection angle of the aileron at the first threshold and a predetermined angle.

4. The method of claim 1, wherein, when the spoiler deflection angle is above a second threshold, the at least one aileron control signal comprises a second aileron control signal for causing the at least one aileron to deflect upwards to a predetermined angle.

5. The method of claim 4, wherein the at least one second aileron control signal is sent to the at least one aileron when the spoiler deflection angle is above the second threshold and below a third threshold greater than the second threshold.

6. The method of claim 4, wherein, when the spoiler deflection angle is below the first threshold, the at least one aileron control signal comprises at least one third aileron control signal for allowing the at least one aileron a substantially complete range of motion.

7. The method of claim 1, wherein monitoring the spoiler deflection angle of at least one spoiler of the aircraft comprises continuously monitoring the spoiler deflection angle.

8. The method of claim 1, wherein the at least one aileron control signal differs based on a direction of deployment of the spoiler.

9. The method of claim 8, wherein the aileron control signal causes the at least one aileron to deflect along one of two portions of hysteresis trajectory based on the direction of deployment of the spoiler.

10. The method of claim 1, wherein the aileron control signal causes the at least one aileron to deflect along a trajectory based on a rate of change of the spoiler deflection angle.

11. The method of claim 1, wherein monitoring the spoiler deflection angle comprises receiving a command and extracting the spoiler deflection angle therefrom.

12. The method of claim 1, wherein:
   sending the at least one aileron control signal comprises sending a respective aileron control signal to a plurality of portions of at least one split aileron; and
   causing the at least one aileron to deflect based on the spoiler deflection angle comprises causing each portion of the at least one split aileron to deflect based on the spoiler deflection angle.

13. The method of claim 12, wherein:
   the plurality of portions of the at least one split aileron comprises at least a first group of portions and a second group of portions; and
   causing each portion of the at least one split aileron to deflect based on the spoiler deflection angle comprises:
      causing the first group of portions to deflect by a first aileron deflection angle; and
      causing the second group of portions to deflect by a second aileron deflection angle.

14. A system for managing gust loading in an aircraft, the system comprising:
   a processing unit; and
   a non-transitory memory communicatively coupled to the processing unit and comprising computer-readable program instructions executable by the processing unit for:
      monitoring a spoiler deflection angle of at least one spoiler of the aircraft; and
      when the spoiler deflection angle is above a first threshold, sending at least one aileron control signal for causing at least one aileron to deflect based on the spoiler deflection angle.

15. The system of claim 14, wherein when the spoiler deflection angle is above the first threshold and below a second threshold greater than the first threshold, the at least one aileron control signal comprises a first aileron control signal for causing the at least one aileron to deflect according to an interpolated trajectory.

16. The system of claim 15, wherein the interpolated trajectory is a linearly-interpolated trajectory based on an aileron deflection angle of the aileron at the first threshold and a predetermined angle.

17. The system of claim 14, wherein, when the spoiler deflection angle is above a second threshold, the at least one aileron control signal comprises a second aileron control signal for causing the at least one aileron to deflect upwards to a predetermined angle.

18. The system of claim 17, wherein the at least one second aileron control signal is sent to the at least one aileron when the spoiler deflection angle is above the second threshold and below a third threshold greater than the second threshold.

19. The system of claim 17, wherein, when the spoiler deflection angle is below the first threshold, the at least one aileron control signal comprises at least one third aileron control signal for allowing the at least one aileron a substantially complete range of motion.

20. The system of claim 14, wherein monitoring the spoiler deflection angle of at least one spoiler of the aircraft comprises continuously monitoring the spoiler deflection angle.

21. The system of claim 14, wherein the at least one aileron control signal differs based on a direction of deployment of the spoiler.

22. The system of claim 21, wherein the aileron control signal causes the at least one aileron to deflect along one of two portions of hysteresis trajectory based on the direction of deployment of the spoiler.

23. The system of claim 14, wherein the aileron control signal causes the at least one aileron to deflect along a trajectory based on a rate of change of the spoiler deflection angle.

24. The system of claim 14, wherein monitoring the spoiler deflection angle comprises receiving a command and extracting the spoiler deflection angle therefrom.

25. The system of claim 14, wherein:
sending the at least one aileron control signal comprises sending a respective aileron control signal to a plurality of portions of at least one split aileron; and
causing the at least one aileron to deflect based on the spoiler deflection angle comprises causing each portion of the at least one split aileron to deflect based on the spoiler deflection angle.

26. The system of claim 25, wherein:
the plurality of portions of the at least one split aileron comprises at least a first group of portions and a second group of portions; and
causing each portion of the at least one split aileron to deflect based on the spoiler deflection angle comprises:
  causing the first group of portions to deflect by a first aileron deflection angle; and
  causing the second group of portions to deflect by a second aileron deflection angle.

\* \* \* \* \*